(12) United States Patent
Kennedy et al.

(10) Patent No.: US 9,001,665 B2
(45) Date of Patent: Apr. 7, 2015

(54) NETWORK CONTROL

(75) Inventors: Irwin O. Kennedy, Londonderry (GB);
Barnard L. Kroon, Ballymahon (IE)

(73) Assignee: Alcatel Lucent, Boulogne-Billancourt (FR)

( * ) Notice: Subject to any disclaimer, the term of this patent is extended or adjusted under 35 U.S.C. 154(b) by 180 days.

(21) Appl. No.: 13/643,497

(22) PCT Filed: Apr. 15, 2011

(86) PCT No.: PCT/EP2011/001912
§ 371 (c)(1),
(2), (4) Date: Jan. 2, 2013

(87) PCT Pub. No.: WO2011/144283
PCT Pub. Date: Nov. 24, 2011

(65) Prior Publication Data
US 2013/0100814 A1    Apr. 25, 2013

(30) Foreign Application Priority Data

Apr. 30, 2010   (EP) ..................................... 10360021

(51) Int. Cl.
*H04L 1/00*    (2006.01)
*H04W 4/00*    (2009.01)
(Continued)

(52) U.S. Cl.
CPC ............ *H04W 72/087* (2013.01); *H04W 16/14* (2013.01); *H04W 72/1215* (2013.01);
(Continued)

(58) Field of Classification Search
USPC ................. 370/236, 328, 338, 389; 455/41.2, 455/452.2
See application file for complete search history.

(56) References Cited

U.S. PATENT DOCUMENTS 5,903,843  A  *  5/1999  Suzuki et al. ............... 455/452.2
2005/0141498  A1 *  6/2005  Cam Winget et al. ........ 370/389
(Continued)

FOREIGN PATENT DOCUMENTS

EP    2 028 892 A1    2/2009
EP    2 051 551 A2    4/2009
(Continued)

OTHER PUBLICATIONS

Byoung Hoon Jung et al., "Ubiquitous Werable Computer (UWC_-Aided Coexistence Algorithm in an Overlaid Network Environment of WLAN and ZigBee Networks," Wireless Pervasive Computing, IEEE, XP031072437, pp. 212-217, Feb. 1, 2007.
(Continued)

*Primary Examiner* — Kiet Tang
(74) *Attorney, Agent, or Firm* — Fay Sharpe LLP

(57) ABSTRACT

A method and network node for controlling operation of first and second wireless communication networks both operating in a predetermined frequency band. The first communication network is operable to communicate within a plurality of first network channels within the predetermined frequency band. The second communication network is operable to communicate within at least one second network channel within the predetermined frequency band. Each of the second network channels co-exist in a frequency range occupied by a plurality of the first network channels. The method comprises the steps of: determining that there may be data to be communicated within a network channel of one of the first and second wireless communication networks, transmitting a channel restriction message to another of the first and second wireless communications networks, the channel restriction message instructing prevention of communication within the another of the first and second wireless communications networks on at least one network channel in the another of the first and second wireless communications networks coexisting in a frequency range occupied by the network channel; and instructing communication within the one of said first and second wireless communication networks on said channel. Receiving an indication of quality of service of data traffic in said first and second wireless communication networks and scheduling transmission of said channel restriction message to minimize disruption to said data traffic in said first and second wireless communication networks.

13 Claims, 7 Drawing Sheets

(51) Int. Cl.
*H04L 12/28* (2006.01)
*H04B 7/00* (2006.01)
*H04W 72/00* (2009.01)
*H04W 72/08* (2009.01)
*H04W 72/12* (2009.01)
*H04W 28/02* (2009.01)
*H04W 16/14* (2009.01)
*H04W 74/08* (2009.01)
*H04W 84/12* (2009.01)
*H04W 84/18* (2009.01)
*H04W 88/10* (2009.01)

(52) U.S. Cl.
CPC ....... *H04W72/1278* (2013.01); *H04W 74/0816* (2013.01); *H04W 84/12* (2013.01); *H04W 84/18* (2013.01); *H04W 88/10* (2013.01); *H04W 28/0268* (2013.01)

(56) References Cited

U.S. PATENT DOCUMENTS

| | | |
|---|---|---|
| 2007/0225044 A1 | 9/2007 | Law et al. |
| 2008/0279162 A1 | 11/2008 | Desai |
| 2009/0103474 A1* | 4/2009 | Lu et al. ................. 370/328 |
| 2009/0137206 A1* | 5/2009 | Sherman et al. ......... 455/41.2 |
| 2011/0149939 A1* | 6/2011 | Wang et al. .............. 370/338 |

FOREIGN PATENT DOCUMENTS

| | | |
|---|---|---|
| JP | 2010-035179 | 2/2010 |
| JP | 2010-081341 | 4/2010 |
| WO | WO 2010/018505 | 2/2010 |

OTHER PUBLICATIONS

Min Li Huang et al., "A WLAN and ZigBee Coexistence Mechanism for Wearable Health Monitoring System," Communications and Information Technology, IEEE, XP031571262, pp. 555-559, Sep. 28, 2009.

IEEE Standards, "Coexistence of Wireless Personal Area Networks with Other Wireless Devices Operating in Unlicensed Frequency Bands," IEEE vol. 802.15.2, XP007900722, 226 pages, Aug. 28, 2003.

International Search Report for PCT/EP2011/001912 dated Jul. 4, 2011.

* cited by examiner

NETWORK CONTROL

FIELD OF INVENTION

The present invention relates to a method of controlling operation of first and second wireless communication networks, both operating in a predetermined frequency band, a network node operable to perform that method and a computer program product.

BACKGROUND

Wireless communication systems are known. In a cellular system, radio coverage is provided to network nodes, for example, personal computers, by geographical area. A base station is located in each geographical area to provide radio coverage. Network nodes in each geographical area receive information and data from the base station and transmit information and data to the base station.

Wireless communication networks typically operate in the radio frequency range. Operation of various communication networks may occur within a predetermined radio frequency range. Each type of communication network provided in that predetermined frequency range may operate according to a set of standard protocols. There may, for example, be Bluetooth, Wi-Fi, and other similar network protocols operating within the same predetermined frequency range. Data and information being sent within each wireless communication network may interfere with information and data being sent on other communication networks. This may lead to suboptimal operation of both or all communication networks provided within that frequency range in a given geographical area.

Accordingly, it is desired to provide a method of controlling operation of wireless communication networks operating in the same predetermined frequency band.

SUMMARY

Accordingly, a first aspect provides a method of controlling operation of first and second wireless communication networks both operating in a predetermined frequency band, the first communication network being operable to communicate within a plurality of first network channels within the predetermined frequency band, the second communication network being operable to communicate within at least one second network channel within the predetermined frequency band, each of the second network channels coexisting in a frequency range occupied by a plurality of the first network channels, the method comprising the steps of:

determining that there may be data to be communicated within a network channel of one of the first and second wireless communication networks, transmitting a channel restriction message to another of the first and second wireless communications networks, the channel restriction message instructing prevention of communication within the another of the first and second wireless communications networks on at least one network channel in the another of said first and second wireless communications networks coexisting in a frequency range occupied by the network channel; and instructing communication within the one of the first and second wireless communications networks on the channel.

Typically, when commissioned or installed, a wireless communication network scans a predetermined radio frequency range for other networks operating in that area. On the basis of that scan and bands determined to be free from radio communication, the network selects a clear band upon which to operate. If a cell is uncongested, it can be readily understood that the operation of one or more communication networks may be substantially independent from one another, since they may be operating in regions of the predetermined frequency range which do not overlap. However, it will be appreciated that that as more wireless communication networks are provided, the likelihood of interference between networks increases. A method in accordance with the first aspect provides a way of controlling operation of first and second wireless communication networks both operating in a predetermined frequency band in the same geographic area of coverage (also known as a cell).

In a congested cell a base station, or network node, operates to determine that there may be data to be communicated within a network channel of a communication network. Once it has been determined that there is data to be communicated within a network, it operates to transmit a channel restriction message to another network. The channel restriction message instructs prevention of communication within the second on least one network channel. Suppression of communication on one network allows another network to use a communication channel or band co-located, overlapping or within, the suppressed band.

The first aspect recognises that one way in which an area congested with wireless communication networks may maintain functionality is to act to disrupt the operation of one network in favour of another, thereby mitigating the case in which both networks continue to try to operate on the same frequency, causing disruption to both networks.

The first aspect further appreciates that rather than simply increasing the power of transmission in each network to try and ensure data is successfully transmitted, thereby wasting energy unnecessarily, it can be advantageous to share an available frequency spectrum more efficiently.

In one embodiment, the step of determining whether there may be data to be communicated comprises the step of:

determining that a network node in the one of the first and second wireless communication networks is scheduled to transmit data.

Accordingly, that determination may, in some cases involve determining that network nodes in one of the first and second networks are scheduled to transmit data at a particular time. Those nodes may not have data to transmit or communicate and the method acts to clear a slot in the radio spectrum as a precaution.

In one embodiment, the step of determining whether there may be data to be communicated comprises the step of:

receiving an indication that there is data to be sent within the one of the first and second wireless communication networks.

Accordingly, the determination step may comprise receiving an indication that there is data to be sent, for example, a preliminary request to communicate, sent by a network node to a base station, or vice versa.

In one embodiment, the method further comprises the steps of:

receiving an indication of likely data traffic in the first and second wireless communication networks and scheduling transmission of the channel restriction message to minimise disruption to the data traffic in the first and second wireless communication networks.

Accordingly, potential disruption to operation of the first and second communication networks may be minimised by appropriate scheduling of the channel restriction message. If a network is communicating data with a high quality of service, for example voice or video data, and a second network wishes to transmit data with a low quality of service, disruption of the first network may be postponed until a more appropriate moment, when data without high quality of service is no longer being transmitted. It will be understood that such an arrangement is particularly useful when scheduling and other base station functions are carried out on both networks by a single controller, having visibility of current and likely data traffic within the first and second wireless communication networks.

In one embodiment, the method further comprises the steps of:
assessing radio traffic occurring in the channels of the predetermined frequency band to determine channels experiencing low data traffic; and based on the assessment,
selecting a channel experiencing low radio traffic to be the channel on which there is data to be communicated on the one of the first and second wireless communications networks.

Accordingly, although it may be typical for a communication network to choose a band or channel on which to communicate when initialising, or when commissioned, in order to make best possible use of available frequency spectrum, a channel may be selected according to low data traffic, thereby minimising disruption to all other networks.

In one embodiment, the channel restriction message instructs prevention of communication on at least one network channel in the another of the first and second wireless communication networks for a predetermined time period. Accordingly, potential disruption to the another of said first and second networks may be proportionate, or minimised, in accordance with data to be transmitted within the said first or second network.

In one embodiment, the channel restriction method comprises a clear to send (CTS) message sent to each network node in the another of the first and second wireless communication networks.

Some wireless communication network protocols, for example, networks operating in accordance with WiFi protocol, may already include a functionality to operate according to a call and return loop, whereby a network node asks to communicate and then is given permission to communicate with a base station. Use of a call and return signalling may allow re-use of a known network protocol between two different networks operating in the same geographic area in the same frequency range. A "clear to send" message may, for example, be transmitted by a base station or network controller in response to a "request to send" message from a network node, and may typically be addressed to a particular node, allowing that particular node to communicate. Furthermore, nodes may be operable, on receipt of a clear to send message addressed to another node, to restrict or suppress any transmission or communication whilst such a clear to send message has effect. It will be understood that a clear to send message may have effect for a predetermined period according to protocol, or may itself contain information regarding how long such instructions are in operation.

In one embodiment, the channel restriction method comprises a request to send (RTS) message sent to each network node in the another of the first and second wireless communication networks.

Accordingly, it will be understood that if a network node receives an indication that another network node is about to transmit, for example, due to receipt of a "request to send" message from a network node, it may choose to restrict communication on a channel on which that request to transmit message was received.

In one embodiment, the channel restriction method comprises a deauthorisation (Deauth) message sent to each network node in the another of the first and second wireless communication networks, causing disconnection of each the network node from the first or second wireless communication network.

It will be appreciated that not all communication networks have call and return functionality when controlling communication within the network and that in such networks it may prove necessary to find alternative means to restrict communication on a particular channel or channels, thereby clearing a region of frequency spectrum for use by a second network. A deauthorisation (DeAuth) message may be used to cause restriction of communication. Such a message acts to disallow communication from a network node to a base station, and forces re-authentication and reconnection. During the time a node which has been deauthorised is reconnecting, communication may occur within a second network.

In one embodiment, one of the first and second networks comprises a set of network nodes operating on a restricted power source. An example of such a network would be one in which network nodes operate on, for example, batteries or cells. Disruption to communication and interference experienced in such a case may be particularly disadvantageous, since if communication does not occur successfully, there may be a need to re-send data, or increase transmission power. In a power limited network, such tasks may advantageously be minimised, thereby extending the battery life of nodes.

In one embodiment, one of the first and second communication networks comprises a machine to machine network. Such networks typically comprise uncomplicated network nodes, with minimal functionality, for example, a series of temperature sensors reporting back to a base station, or motion sensors reporting to a burglar alarm. It is envisaged that a number of independent machine to machine networks, also known as 802.15.4 networks, may operate in areas in which other networks also operate and that the first aspect offers particular advantages when used to control operation of such machine to machine networks. It will be understood that network nodes of machine to machine networks may also operate on limited power sources. In such machine to machine networks, communication may occur infrequently. For example, a gas or electricity meter may include a network node operable to communicate with a control node, and may report back the reading of the meter weekly. Extending the battery life of such power limited network nodes in a machine to machine network allows network nodes to operate for long periods of time without requiring high maintenance.

In one embodiment, one of the first and second communication networks comprises a WiFi network. It will be understood that WiFi is particularly spectrum-hungry and that the first aspect may be advantageously used to allow other networks, such as machine to machine networks, to co-exist successfully in an area heavily served by WiFi.

A second aspect provides a network node operable to control operation of first and second wireless communication networks both operating in a predetermined frequency band,
the first communication network being operable to communicate within a plurality of first network channels within the predetermined frequency band,
the second communication network being operable to communicate within at least one second network channel within the predetermined frequency band, each of the second network channels coexisting in a frequency range occupied by a plurality of the first network channels, the network node comprising:

determination logic operable to determine that there may be data to be communicated within a network channel of one of the first and second wireless communication networks, transmission logic operable to transmit a channel restriction message to another of the first and second wireless communications networks, the channel restriction message instructing prevention of communication within the another of the first and second wireless communications networks on at least one network channel in the another of the first and second wireless communications networks coexisting in a frequency range occupied by the network channel; and instruction logic operable to instruct communication within the one of the first and second wireless communications networks on the channel.

In one embodiment, the determination logic is operable to determine whether there may be data to be communicated by:

determining that a network node in the one of the first and second wireless communication networks is scheduled to transmit data.

In one embodiment, the determination logic is operable to determine whether there may be data to be communicated by:

receiving an indication that there is data to be sent within the one of the first and second wireless communication networks.

In one embodiment, the network node further comprises:

data traffic logic operable to receive an indication of likely data traffic in the first and second wireless communication networks and schedule transmission of the channel restriction message to minimise disruption to the data traffic in the first and second wireless communication networks.

In one embodiment, the network node further comprises:

assessment logic operable to assess radio traffic occurring in the channels of the predetermined frequency band to determine channels experiencing low data traffic; and based on the assessment, selection logic operable to select a channel experiencing low radio traffic to be the channel on which there is data to be communicated on the one of the first and second wireless communications networks.

In one embodiment, the channel restriction message instructs prevention of communication on at least one network channel in the another of the first and second wireless communication networks for a predetermined time period.

In one embodiment, the channel restriction method comprises a clear to send (CTS) message sent to each network node in the another of the first and second wireless communication networks.

In one embodiment, the channel restriction method comprises a request to send (RTS) message sent to each network node in the another of the first and second wireless communication networks.

In one embodiment, the channel restriction method comprises a deauthorisation (Deauth) message sent to each network node in the another of the first and second wireless communication networks, causing disconnection of each the network node from the first or second wireless communication network.

In one embodiment, one of the first and second networks comprises a set of network nodes operating on a restricted power source.

In one embodiment, one of the first and second communication networks comprises a machine to machine network.

In one embodiment, one of the first and second communication networks comprises a wifi network.

A third aspect provides a computer program product, operable when executed on a computer, to perform the method steps of the first aspect.

Further particular and preferred aspects are set out in the accompanying independent and dependent claims. Features of the dependent claims may be combined with the features of the independent claims as appropriate, and in combinations other than those explicitly set out in the claims.

BRIEF DESCRIPTION OF THE EMBODIMENTS

Embodiments of various aspects will now be described further, with reference to the accompanying drawings, in which.

DESCRIPTION OF THE EMBODIMENTS

Figure 1:
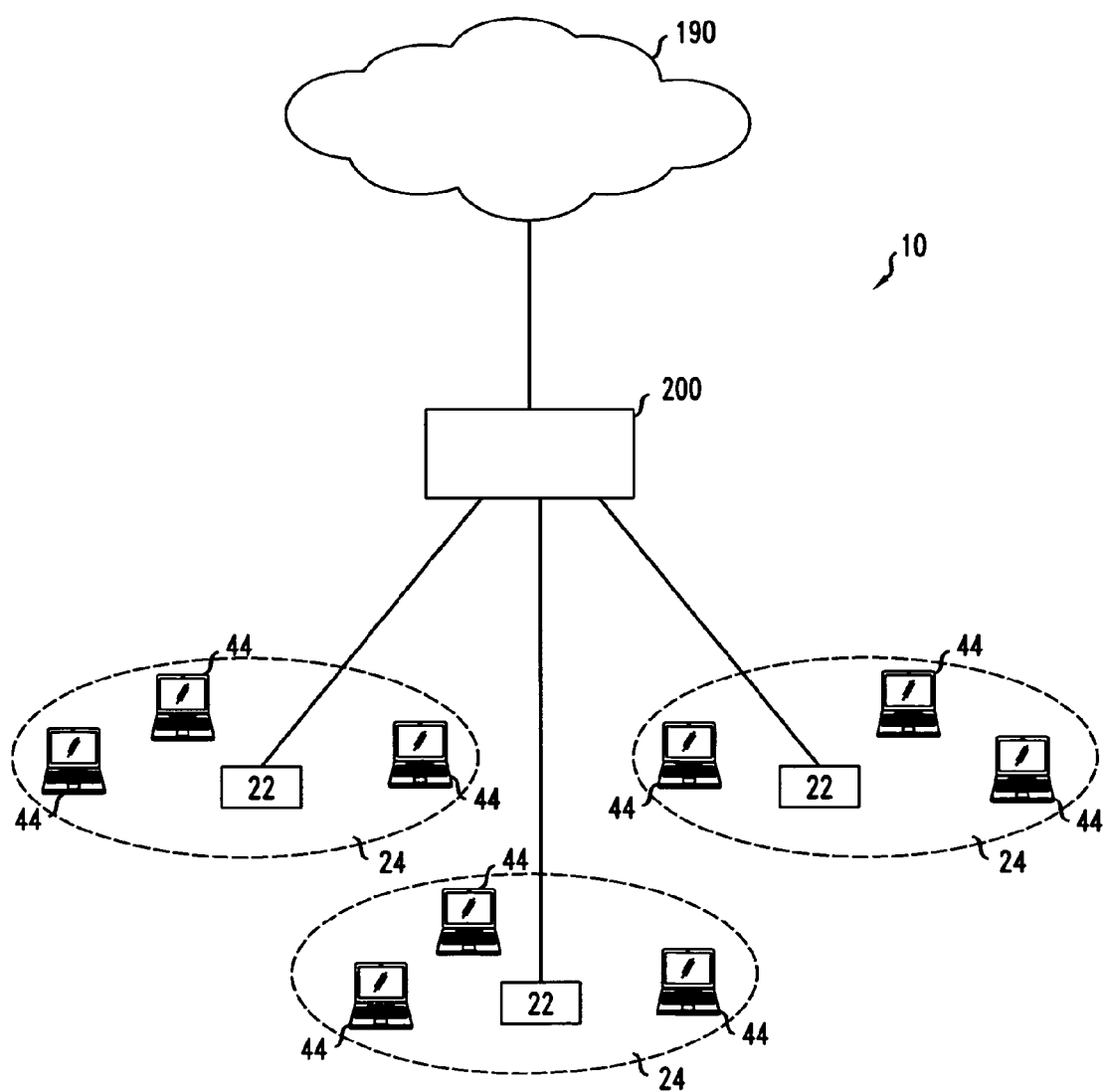
FIG. 1 illustrates schematically the main components of a wireless communications network according to one embodiment.

FIG. 1 illustrates schematically a typical wireless communications network. The network shown in FIG. 1 may, for example, comprise a WiFi network. It will be understood that the principle of operation of such a WiFi network may also be applied to, for example, a machine-to-machine (M2M) wireless communication, or other type of wireless communication network. The WiFi wireless communication network, generally 10 shown in FIG. 1 comprises computer stations 44 located within a geographical area. That geographical area may, for example, comprise a factory or office building. WiFi base stations 22 are provided which support respective geographical areas of coverage, known as cells 24. A number of such base stations are provided which are distributed geographically in order to provide a wide area of coverage to computer stations 44. It will be understood that such an arrangement may occur in an office environment wherein each WiFi base station 22 supports a set of computers 44 provided on different floors or within different offices within an office block.

Computer equipment 44 within a cell 24 supported by a base station 22 can communicate with a base station 22 and vice versa over an associated radio link.

Each base station 22 typically supports communication with a number of computers 44. Of course, it will be appreciated that FIG. 1 illustrates a small sub-set of the total number of possible computer stations and base stations that may be present in a typical geographic area.

Each Wi-Fi base station 22 may communicate via Public Switched Telephone Network (PSTN) 200, which, in turn, is able to communicate with a packet switch core 190 such as, for example, the Internet.

Figure 2:
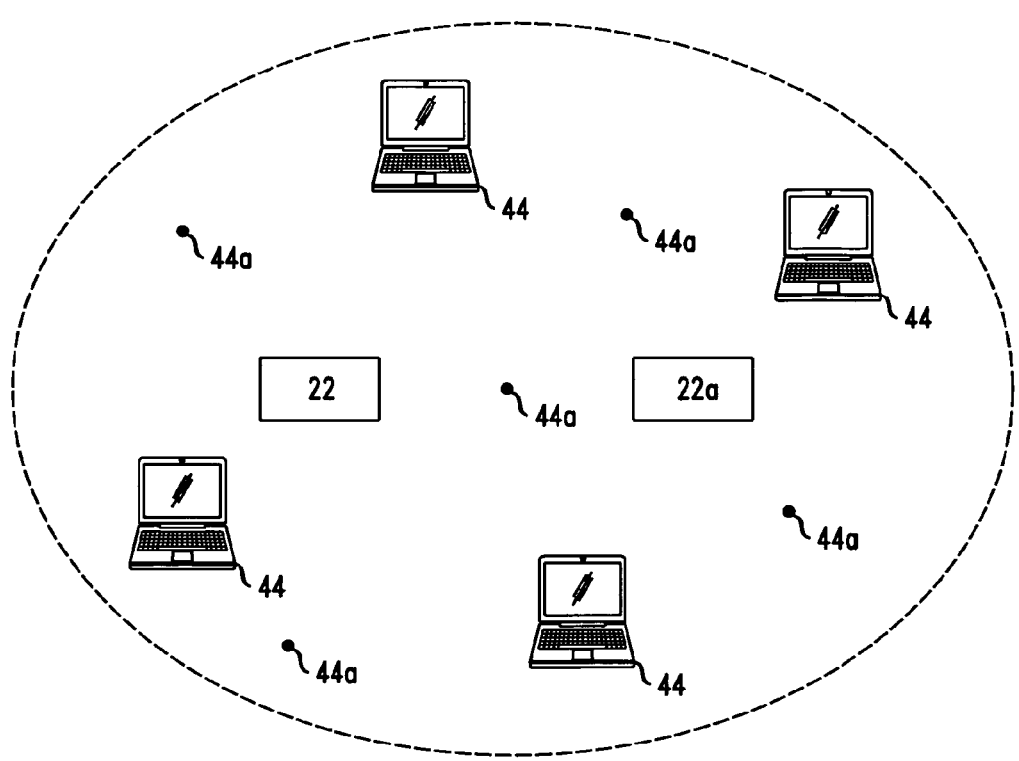
FIG. 2 illustrates schematically the main components of two wireless communications networks according to one embodiment operating in one geographical area in a predetermined frequency range.

FIG. 2 illustrates schematically the main components of two wireless communications networks according to one embodiment operating in one geographical area. Both wireless communication networks operate in the same predetermined frequency range.

In the wireless communication network shown, two independent wireless communication networks operate. One example of an implementation of such a communications network may be a factory. The wireless communication networks operate in the factory and the geographical area served by the two operable networks is represented as cell 24. The geographical area 24 may include a first wireless communication network. That first wireless communication network comprises a plurality of network nodes 44a and those network nodes 44a are served by a base station 22a. Network nodes 44a comprise, in this particular example, a plurality of temperature sensors operable to communicate wirelessly with base station 22a. Such a network operates according to Machine to Machine network protocols. The temperature sensors may, for example, form part of a heating and cooling system provided in the various regions of a factory.

Cell 24 is also served by a second wireless communication network. The second wireless communication network comprises a series of network nodes 44 operable to communicate with a base station 22. Network nodes 44 comprise a series of computer stations, in this particular example, and each operable according to WiFi protocol to communicate with a WiFi router 22. It will be appreciated that whilst an M2M and WiFi network form the basis of the example of FIG. 2, other wireless communications networks may also operate according to the principles of various embodiments described herein.

It will be understood that a machine-to-machine type network such as that represented by nodes 44a and controller 22a and a WiFi network such as that represented by computers 44 and WiFi router 22 each typically operate in the same predetermined frequency band. In the embodiment shown in FIG. 2, those networks both operate using the Industrial Scientific and Medical (ISM) band at 2.4 GHz. That predetermined frequency band may be used by various wireless systems subject to certain constraints such as, for example, maximum transmit power. It will thus be appreciated that various radio frequency communication networks may co-exist within the 2.4 GHz frequency band. Each of those networks may operate according to a set of substantially independent standards. The standards and protocols governing each type of network, for example machine-to-machine, WiFi, Bluetooth and others, may not adequately operate to take into account other possible networks operating in the same geographical area.

In the embodiment shown in FIG. 2, a machine-to-machine network co-exists with another wireless system, in this case a WiFi network. A WiFi network, also known as an 802.11 network, is typically installed using agreed channels of the Industrial Scientific and Medical band at 2.4 GHz. A machine to machine network, also known as an 802.15.4 network, also operates on agreed channels of the ISM band at 2.4 Ghz. The channels allocated to M2M and WiFi networks in the ISM band are described in more detail in relation to FIG. 3.

It is possible for a machine-to-machine network to operate by identifying an ISM spectrum band that is unused by an 802.11 network and instructing use of those spectrum bands form the second communication system. Such an arrangement may be unsatisfactory for a number of reasons. In the USA and Europe, all three 802.11 non-overlapping bands inside the ISM spectrum at 2.4 GHz may be in use by a single frequency, planned 802.11 network, or a group of WiFi networks provided at the same location. If all three bands are in use, only a small section of the spectrum is available at the upper end of the ISM band. If this small section of spectrum is used by a machine-to-machine network, also known as an 802.15.4 network, no ISM spectrum remains available.

The size of the ISM band may be dependent on the country in which a particular network or device is located. The UK and USA have a similar frequency range dedicated to the ISM band at 2.4 GHz. However, Japan, France and Spain have significantly less spectrum allocated to the ISM band, and may, for example, only have two available WiFi channels available in that allocated spectrum. This increases the need for a machine-to-machine network to co-exist with WiFi in those countries, since less ISM spectrum is generally available.

If no ISM spectrum is available, one possible solution for a machine-to-machine network to co-exist with a WiFi network is to ensure machine-to-machine networks provided in the same area use bands occupying a guard band area provided between WiFi bands within the predetermined frequency range provided at 2.4 GHz. If such an approach is adopted, there are a total of four possible machine-to-machine bands that exist outside allocated Wi-Fi bands. The guard bands are not, however, free from radiation, since there are inevitably out of band emissions from the three typical WiFi bands. The extent to which out of band emissions exist is regulated by WiFi protocol. Necessarily, WiFi protocol has set up guard bands so that they reduce the interference to neighbouring Wi-Fi bands to an acceptable level. However, inside such a guard band interference power may be significant, particularly if it is envisaged to provide machine-to-machine communication bands in those guard bands. Interference power affects a receiver's ability to detect an intended signal and, as such, interference from out of band emissions in the guard bands may reduce the range of link for a given transmit power of a machine-to-machine type node, for example, the temperature sensors 44a shown in FIG. 2.

It is possible to commission wireless communication networks provided in a single area to operate such that they assess received power levels within radio channels. If a network node determines that a power level received in a particular radio channel falls below a particular threshold, that node may assume it is safe to transmit. Such an arrangement does not, however, avoid collisions (the case where two nodes are transmitting on the same and at the same time) or deal with the hidden terminal problem. Furthermore, it will be appreciated that in the example illustrated, a machine-to-machine network may be highly power constrained due to the nodes, in this case, temperature sensors, being powered by small cells or batteries. Provision of additional sensors and hardware relating to assessment of spectrum for existing transmissions, is energy and hardware expensive, and may not be appropriate in networks such as machine to machine networks where simplicity and low cost of network nodes is of significance.

Figure 3:
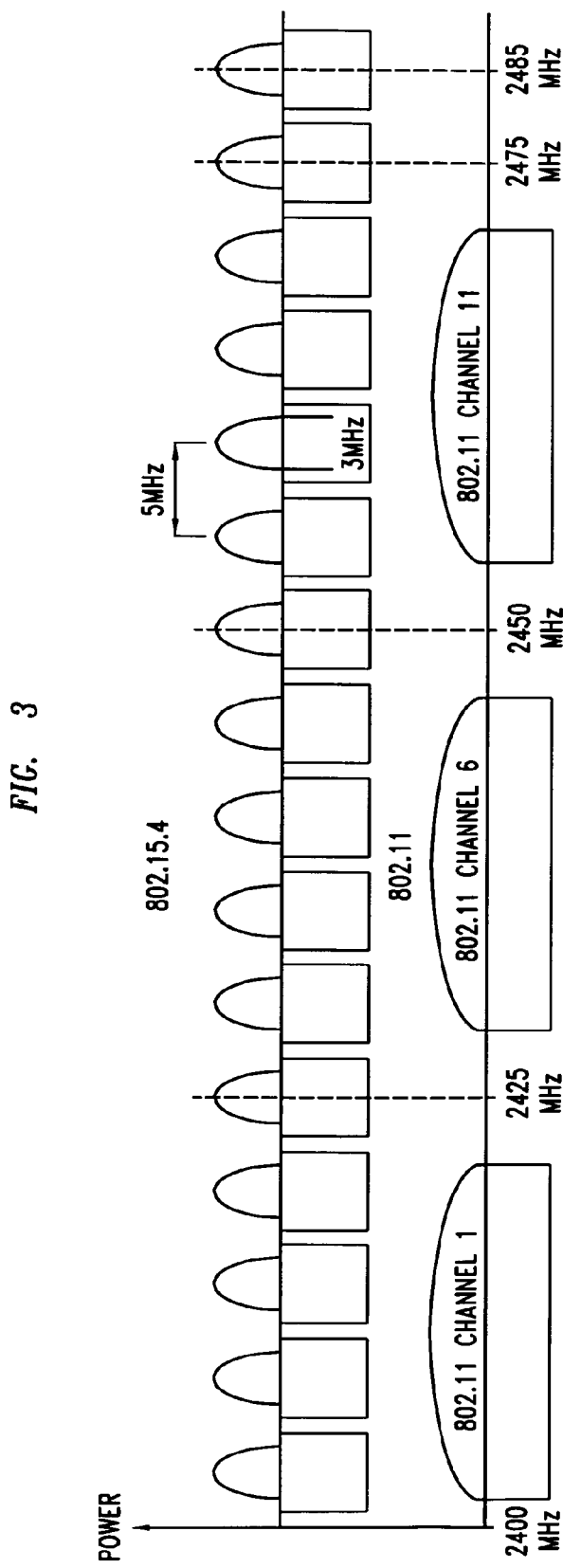
FIG. 3 is a schematic representation of various channels allocatable to each wireless communication network shown in FIG. 2.

FIG. 3 illustrates schematically various channels allocatable to each wireless telecommunications network shown in the embodiment of FIG. 2. FIG. 3 illustrates the ISM band at 2.4 GHz. The predetermined frequency range allocated to ISM spans from 2.4 GHz to 2.485 GHz. The available bands in a machine-to-machine network and a WiFi network are shown on upper and lower axes of FIG. 3 respectively. As can be seen from the upper axis, 16 bands are provided within the ISM band for machine-to-machine communication. Those frequency bands have a width of 3 MHz and are spaced by 5 MHz. Available Wi-Fi bands within the ISM 2.4 GHz spectrum are shown on the lower axis of FIG. 3. Three bands are provided, known as channel 1, channel 6 and channel 11. The space between WiFi channels and the large space at the upper end of the available predetermined frequency range band align with four bands provided in the machine-to-machine band provision. However, as described above, it may not be possible to simply use one of those four bands when initializing a machine-to-machine network in an area already used by a Wi-Fi network.

Figure 4:
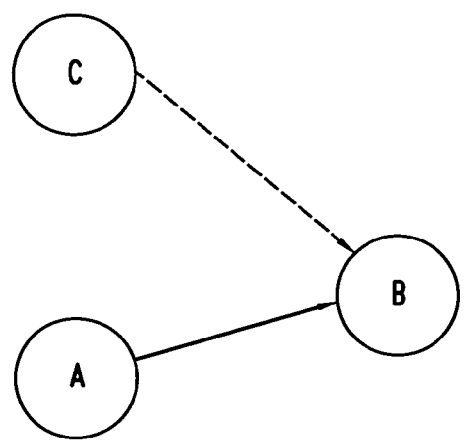
FIG. 4 illustrates schematically a hidden node problem which may occur in wireless communication networks.

FIG. 4 illustrates schematically a hidden node problem which may occur in wireless communication networks. Such a phenomenon may occur when a shared frequency band is assessed by a network node and that band is incorrectly determined by that network node to be free from use by a transmitter. FIG. 4 illustrates a wireless communication network comprising three network nodes; A, B, C. Node A communicates with node B, as shown by the solid arrow. In the example shown in FIG. 4, node A is transmitting and node B is receiving. If node C wishes to communicate, it operates to sense and assess communication occurring in the network around it. Node C may sense whether a shared communication channel is free from communication. In the case illustrated in FIG. 4 it may incorrectly determine that there is no communication occurring on the relevant communication channel. Having established incorrectly that there is no communication occurring in the shared channel, it may itself take steps to establish communication with node B by starting to transmit. Node C then also transmits, as shown by the dashed line in FIG. 4. In such a scenario, node C's signal interferes with node A's signal at the receiver node B. As a result, neither node A's signal, nor node C's signal is successfully received at node B, due to "collision" of the transmissions. This problem is described as the "hidden terminal problem" because node A was effectively hidden from node C due to the prevailing radio propagation environment.

Some wireless communication networks have a series of protocols and procedures which help to mitigate the chance of such a phenomenon causing disruption to the operation of the network as a whole. According to WiFi protocol, for example, to deal with the hidden terminal problem, a standard call and response acknowledgement mechanism used. That mechanism comprises the sending of "Request To Send (RTS)" control messages and "Clear To Send (CTS)" control messages.

The operation of that protocol using RTS and CTS messages can be used to reduce the chances of collision. In the example shown in FIG. 4, for example, when node A has information to transmit, in addition to sensing the channel prior to transmission, node A also broadcasts an RTS message. Once received at Node B, and processed, Node B responds with a CTS message, to all nodes in the network. That CTS message is received by both nodes A and C. The structure of the CTS and RTS messages are described in more detail in relation to FIGS. 5a, b and c. The CTS message tells the network nodes that node A is "clear to send" and also contains information relating to the length of time for which a channel is reserved for transmission by node A. When received by node C (or other nodes in the network), a CTS message sets a timer in node C corresponding to the time specified in the CTS message. When node C has a transmission to make, it checks the timer to see if all channel reservations have expired. It will then reserve the channel for itself by exchanging RTS and CTS messages with node B before transmitting. It can thus be understood hat a CTS message effectively clears a channel for communication by one network node, whilst the remainder have been instructed not to communicate on that channel.

Figure 5A:
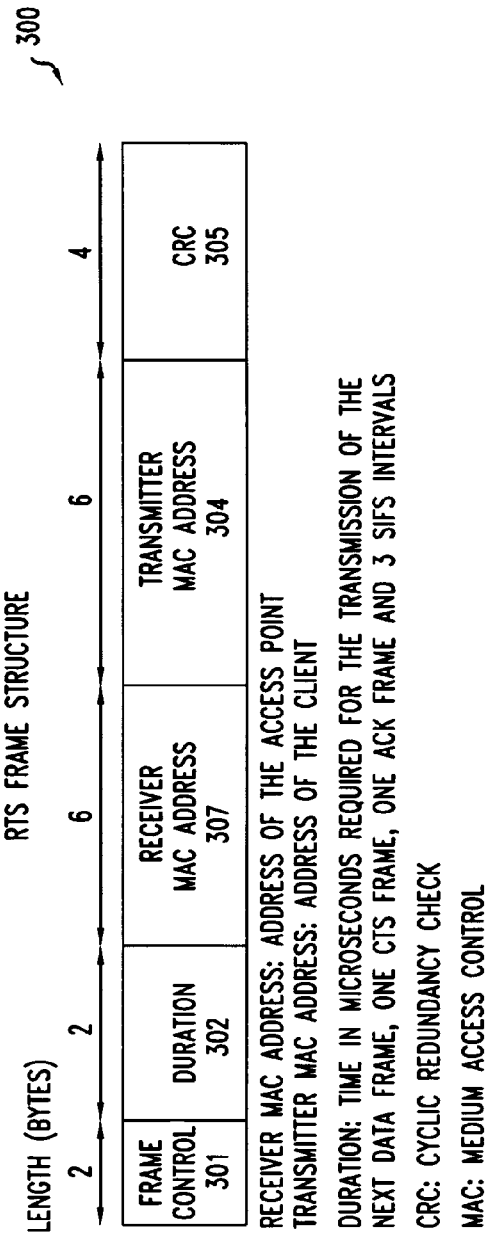
FIG. 5a illustrates schematically an RTS frame structure message of a WiFi network.
Figure 5B:
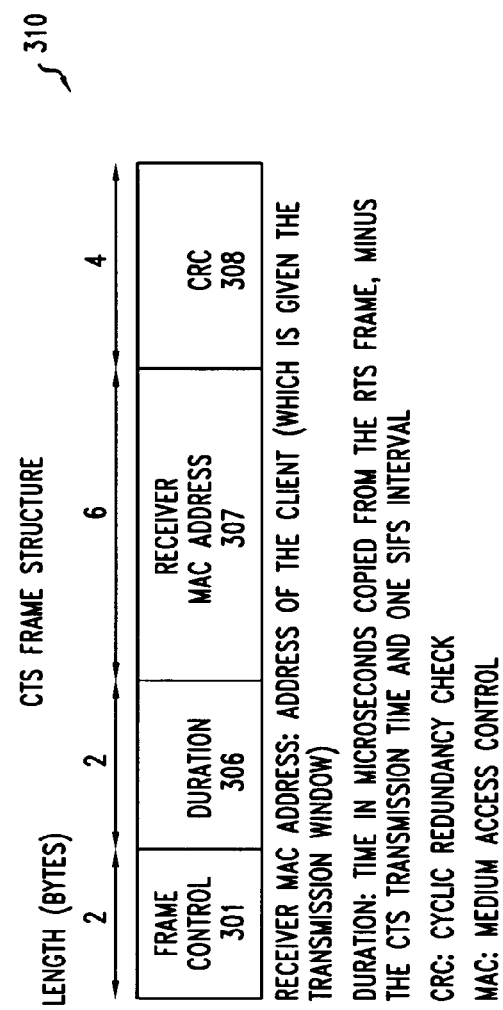
FIG. 5b illustrates schematically a CTS frame structure of a WiFi network.
Figure 5C:
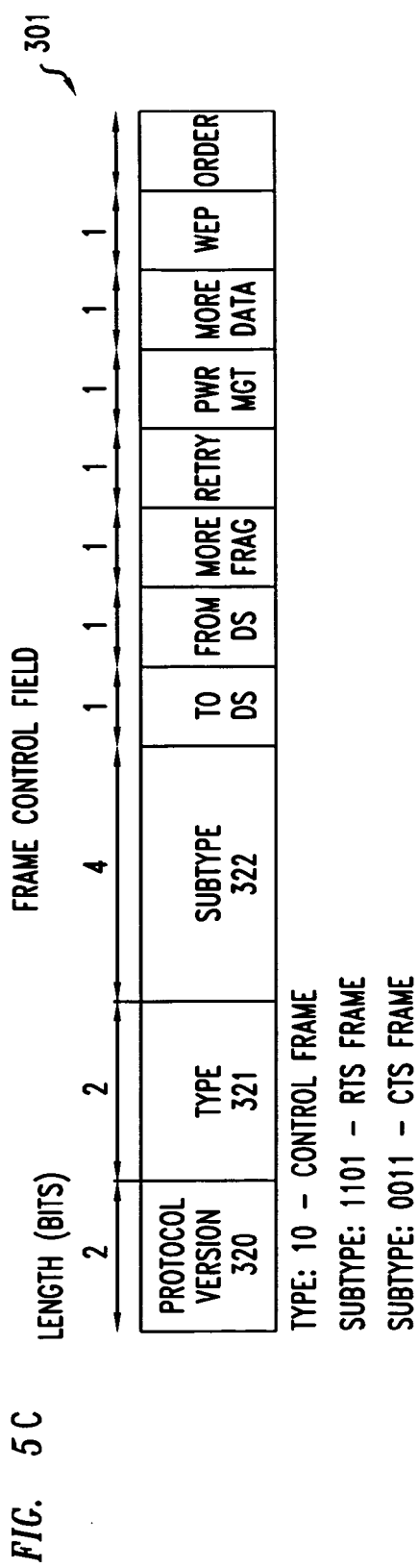
FIG. 5c illustrates a frame control field structure for use in the RTS and CTS frame structures of FIGS. 5a and 5b.

FIG. 5a illustrates schematically the frame structure of an RTS message in a WiFi network. FIG. 5b illustrates schematically the CTS frame structure of a WiFi network and FIG. 5c illustrates the frame control field structure in a WiFi network.

An RTS message 300 comprises 20 bytes: two bytes of frame control 301, two duration bytes 302 containing information relating to the duration of the message to be sent, six bytes 303 which indicate a "receiver" MAC address (in the case of FIG. 4, base station node B), six bytes 304 which indicate a "transmitter" MAC address (in the case of FIG. 4, node A) and four bytes 305 allocated to CRC (cyclic redundancy check).

The receiver MAC address comprises the address of the access point or, in the illustration of FIG. 4, the address of node B. The transmitter MAC (Medium Access Control) address indicates the MAC address of the client; that is to say, the network node that wishes to transmit. In the example shown in FIG. 4, that comprises the MAC address of node A. The duration field indicates the time, in micro-seconds, required by node A for transmission of the next data frame, one clear-to-send frame, one acknowledgement frame, and three SIFS intervals. The CRC frame is a cyclic redundancy check, for example a check sum for identifying errors in the RTS message.

A CTS message 310 comprises 14 bytes, in which: two bytes allocated to a frame control field 301, two bytes allocated to duration 306, which in a CTS message, is the time in micro-seconds copied from the RTS message less the CTS transmission time and one SIFS interval. The CTS message 310 also includes six bytes 307 dedicated to receiver MAC address which, in the case of a CTS message, is the address of the network node which has been allocated the transmission window. In the FIG. 4 case, the receiver MAC address will include the MAC address of node A. The CTS also includes 4 bytes allocated to a CRC check 308 to help identify errors in a received CTS message.

The frame control field 301 shown in FIG. 5c comprises: two bits 320 allocated to protocol version, two bits 321 allocated to type, four bits 322 allocated to sub-type, and eight single bits allocated to various other functions. In relation to the type and sub-type types fields: Type 10 indicates that the frame control is a control frame. Sub-type 1101 indicates an RTS frame and sub-type 0011 indicates a CTS frame.

Figure 6:
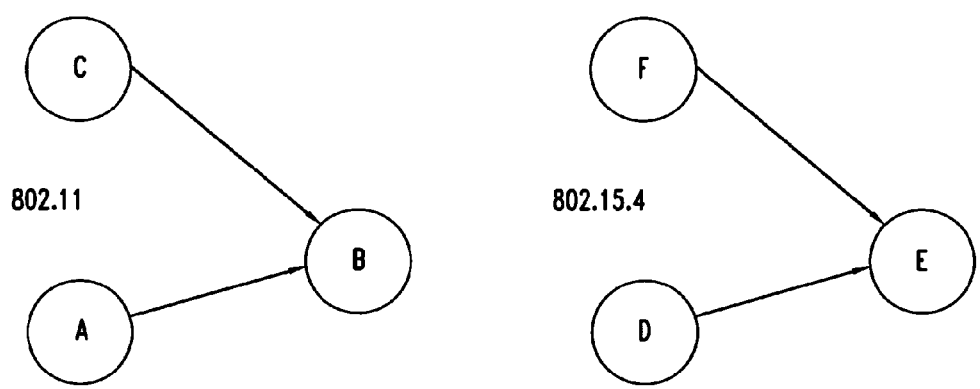
FIG. 6 illustrates schematically a method according to one embodiment.

FIG. 6 illustrates schematically a method according to one embodiment whereby an existing RTS/CTS mechanism such as that used in Wi-Fi networks may be used to control spectrum co-existence between a Wi-Fi network and another wireless standard. In the example shown in FIG. 6, we use machine-to-machine communication as an example of the different wireless standard, but it will be appreciated that the same mechanism may be used for other different wireless standards. FIG. 6 illustrates a Wi-Fi network 802.11, comprising three network nodes A, B and C. There is also provided a machine-to-machine network comprising three network nodes, D, E and F. Node E is a co-ordinator node which operates to manage the machine-to-machine network. Node E is also capable of sending, sensing and receiving messages within the Wi-Fi network comprising nodes A, B and C.

The RTS/CTS mechanism of the 802.11 network may be adapted to allow a machine-to-machine network (802.15.4) to use the same frequency as the existing WiFi network. Nodes A, B and C are provided in a WiFi network. Nodes D, E and F are in the machine-to-machine network. To avoid collision and retransmissions, and improve range for a given transmit power within the machine-to-machine network, it is useful for the machine-to-machine network to be operable to prevent the WiFi network transmitting at times when a machine-to-machine node requires access to the frequency spectrum. In the example illustrated in FIG. 6, both WiFi and machine-to-machine networks are configured to have a central co-ordinator node or access point. These are nodes B and E respectively. In addition to having machine-to-machine co-ordination capabilities, node E also has Wi-Fi capability; that is to say, an 802.11 PHY, radio and MAC.

When the machine-to-machine network requires access to the radio frequency spectrum, node E operates to transmit a CTS message addressed to itself. Such a message alerts all WiFi nodes (nodes A, B and C) to the fact that they ought not to transmit for the period specified in the CTS message transmitted by node E. Once that CTS message has been sent by node E, the nodes provided in the machine-to-machine network can transmit and receive free from interference from transmissions emitted by WiFi nodes.

In general it will thus be understood that when commissioned, the Wi-Fi network of FIG. 6 will scan for other Wi-Fi networks in a cell, then select one of the Wi-Fi bands upon which to operate. Similarly, when commissioned in a cell, the M2M network scans the ISM band for a free frequency range, then selects one of the M2M bands upon which to operate. If a cell is uncongested, it can be readily understood that the operation of a Wi-Fi network and an M2M network may be substantially independent from one another, since they may be operating in regions of the ISM band which do not overlap. However, it can be seen that as more Wi-Fi networks, M2M networks and other communication networks are provided in a cell, the likelihood of interference between networks increases. A method in accordance with one embodiment provides a way of controlling operation of first and second wireless communication networks both operating in a predetermined frequency band.

In a congested cell, a base station, or network node such as node E operates to determine that there may be data to be communicated within a network channel of the M2M network. That determination may be, for example, receipt of an initial request to transmit data from one of the network nodes D or F, or it may be that node E is aware of the schedule according to which nodes D and F typically transmit to node E (for example, once every 5 minutes for a predetermined period).

Once Node E determines that there is data to be communicated within the M2M network, it operates to transmit a channel restriction message to the Wi-Fi network. It will thus be understood that node E is capable of communicating according to both M2M and Wi-Fi protocols. The channel restriction message instructs prevention of communication within the Wi-Fi network on least one network channel. It will be appreciated that in the case of an M2M network suppressing operation of a Wi-Fi network, the suppression of a Wi-Fi band frees operation of several M2M bands, one of which will be the one which the M2M band operates within.

It will be appreciated that the Wi-Fi RTS/CTS protocol offers a mechanism by which node E can send a channel restriction message which suppresses operation of the Wi-Fi network nodes for a predetermined period of time, thereby allowing communication to occur within the M2M network.

Once node E has successfully restricted operation of the Wi-Fi network, it operates to instruct communication within the M2M network on the M2M channel it has cleared of Wi-Fi traffic.

It will be appreciated that node E can exploit knowledge of the machine-to-machine scheduling information to transmit appropriate Request-To-Send and Clear-To-Send messages at the correct time. For example, if there is deterministic scheduling within the machine-to-machine network, for example a beacon-based medium access, node E may be operable to reserve a Wi-Fi channel any time it needs to transmit, and also at any time a node it co-ordinates a schedule to transmit. It will be appreciated that when sending a CTS message to itself, the receiver MAC address, as illustrated in FIG. 5, is sent to the combined Wi-Fi/machine-to-machine access point Wi-Fi address, for example the Wi-Fi address of node E.

It will be appreciated that, in one embodiment, node E could provide both Wi-Fi access point and machine-to-machine co-ordinator functionality. Node E may encompass the functionality of node B, so that node B may be removed from the installation. In this case, node E has knowledge of both Wi-Fi and machine-to-machine network scheduling and activities. Further optimisation of the operation of both wireless communication networks and the RTS/CTS mechanism can therefore be performed by node E. In that way, the needs of the machine-to-machine network can be met whilst minimising the impact on the Wi-Fi network. For example, with knowledge of quality of service requirements, the machine-to-machine access can be co-ordinated and scheduled to occur outside the latency and throughput critical Wi-Fi transmissions.

It will further be appreciated that the method described in relation to FIG. 6 may be implemented to use a feature other than RTS/CTS. For example, DeAuth notifications provided in a Wi-Fi network. A DeAuth notification causes a client or node to be disconnected from the network. Such a node will then attempt to reconnect, including re-authentication. During that disconnection and reconnection process no communication may take place between those nodes and a base station. In the example shown in FIG. 6, node E may issue a DeAuth notification to each of network nodes A, B and C, thereby causing them to be removed from the Wi-Fi network and allowing the machine-to-machine network to communicate whilst they are disconnected and performing reconnection.

Although an embodiment has been described in which operation of a Wi-Fi network is suppressed to allow operation of an M2M network, it is equally possible, via analogous mechanisms to suppress operation of one or more M2M networks to allow operation of a Wi-Fi network. It will be appreciated, since the Wi-Fi bands have a greater width than M2M bands, that several M2M bands may require suppression in order to allow clear Wi-Fi band frequency for communication.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling operation of first and second wireless communication networks both operating in a predetermined frequency band, the first communication network being operable to communicate within a plurality of first network channels within the predetermined frequency band, the second communication network being operable to communicate within at least one second network channel within the predetermined frequency band, each second network channel coexisting in a frequency range occupied by a plurality of the first network channels, the method comprising:

determining whether there are data to be communicated within a communication network channel of one of the first and second wireless communication networks;

transmitting a channel restriction message to another of the first and second wireless communications networks, the channel restriction message instructing prevention of communication within another of the first and second wireless communications networks on at least one network channel in another of the first and second wireless communications networks coexisting in a frequency range occupied by the communication network channel;

instructing communication within one of the first and second wireless communications networks on the communication channel; and receiving an indication of quality of service of data traffic in the first and second wireless communication networks and scheduling transmission of the channel restriction message to minimize disruption to the data traffic in the first and second wireless communication networks having a higher quality of service.

2. The method according to claim 1, wherein determining whether there are data to be communicated comprises:
   determining that a network node in one of the first and second wireless communication networks is scheduled to transmit data.

3. The method according to claim 1, wherein determining whether there are data to be communicated comprises:
   receiving an indication that there are data to be sent within one of the first and second wireless communication networks.

4. The method according to claim 1, wherein the method further comprises:
   assessing radio traffic occurring in the plurality of first network channels and at least one second network channel of the predetermined frequency band to determine channels experiencing low data traffic; and based on the assessment,
   selecting a channel experiencing low radio traffic to be the communication network channel on which there are data to be communicated on one of the first and second wireless communications networks.

5. The method according to claim 1, wherein the channel restriction message instructs prevention of communication on at least one network channel in another of the first and the second wireless communication networks for a predetermined time period.

6. The method according to claim 1, wherein the channel restriction message comprises a clear to send message sent to each network node in another of the first and second wireless communication networks.

7. The method according to claim 1, wherein the channel restriction message comprises a request to send RTS messages to each network node in the another of the first and second wireless communication networks.

8. The method according to claim 1, wherein the channel restriction message comprises a deauthorisation message sent to each network node in another of the first and second wireless communication networks, causing disconnection of each network node from the first or second wireless communication network.

9. The method according to claim 1, wherein one of the first and second networks comprises a set of network nodes operating on a restricted power source.

10. The method according to claim 1, wherein one of the first and second communication networks comprises a machine to machine network.

11. The method according to claim 1, wherein one of the first and second communication networks comprises a wifi network.

12. A network node operable to control operation of first and second wireless communication networks both operating in a predetermined frequency band,
    the first communication network being operable to communicate within a plurality of first network channels within said-the predetermined frequency band,
    the second communication network being operable to communicate within at least one second network channel within the predetermined frequency band,
    each second network channel coexisting in a frequency range occupied by a plurality of said first network channels, the network node comprising:
- determination logic operable to determine whether there are data to be communicated within a communication network channel of one of the first and second wireless communication networks,
- transmission logic operable to transmit a channel restriction message to another of the first and second wireless communications networks, the channel restriction message instructing prevention of communication within the another of the first and second wireless communications networks on at least one network channel in another of the first and second wireless communications networks coexisting in a frequency range occupied by the communication network channel;
- instruction logic operable to instruct communication within one of the first and second wireless communications networks on the communication channel, and
- indication logic operable to receive an indication of quality of service of data traffic in the first and second wireless communication networks and scheduling transmission of the channel restriction message to minimize disruption to the data traffic in the first and second wireless communication networks having a higher quality of service.

13. A method implemented by a programmable device comprising a non-transitory computer-readable storage medium in which a program is saved, the program comprising instructions which, when executed control operation of first and second wireless communication networks both operating in a predetermined frequency band, the first communication network being operable to communicate within a plurality of first network channels within the predetermined frequency band, the second communication network being operable to communicate within at least one second network channel within the predetermined frequency band, each second network channel coexisting in a frequency range occupied by a plurality of the first network channels, the method comprising:
- determining whether there are data to be communicated within a communication network channel of one of the first and second wireless communication networks,
- transmitting a channel restriction message to another of the first and second wireless communications networks, the channel restriction message instructing prevention of communication within another of the first and second wireless communications networks on at least one network channel in another of the first and second wireless communications networks coexisting in a frequency range occupied by the communication network channel;
- instructing communication within one of the first and second wireless communications networks on the communication channel; and
- receiving an indication of quality of service of data traffic in the first and second wireless communication networks and scheduling transmission of the channel restriction message to minimize disruption to the data traffic in the first and second wireless communication networks having a higher quality of service.

* * * * *